United States Patent [19]

Gouritin et al.

[11] Patent Number: 5,258,118
[45] Date of Patent: Nov. 2, 1993

[54] REUSABLE FLUID FILTER

[75] Inventors: Patrice Gouritin, Quimper; Jean Y. Bouchet, Pornic, both of France; Daniel Fertil, Cookeville, Tenn.

[73] Assignee: Fleetguard, Inc., Columbus, Ind.

[21] Appl. No.: 842,836

[22] Filed: Feb. 27, 1992

[30] Foreign Application Priority Data

Feb. 27, 1991 [FR] France .................................. 91 02321

[51] Int. Cl.$^5$ ............................................. B01D 35/02
[52] U.S. Cl. ..................................... 210/206; 210/209; 210/232; 210/455; 210/484; 210/497.3; 210/508; 210/DIG. 17
[58] Field of Search ............... 210/206, 209, 232, 438, 210/455, 484, 497.3, DIG. 17, 508; 165/119, 134.1; 123/198 E; 137/268

[56] References Cited

U.S. PATENT DOCUMENTS 5,050,549 9/1991 Sturmon ............................... 210/209

FOREIGN PATENT DOCUMENTS 715454 9/1954 United Kingdom ................ 210/206

Primary Examiner—Matthew O. Savage
Attorney, Agent, or Firm—Gary M. Gron

[57] ABSTRACT

This invention relates to a reusable filter unit for an internal combustion engine wherein the filter fulfills both a filtering function and an additive function, the filter including a filtering part with replaceable filtering media and an additive part adapted to receive replaceable chemical additives. The filter part includes a generally toroidal shaped plastic element for receiving a generally cone shaped replaceable filter media, which can be agglomerated fiber, the element fitting into, and permanently bonded to, an outer shell, with the additive part being located below the element.

8 Claims, 7 Drawing Sheets 5,258,118

REUSABLE FLUID FILTER

BACKGROUND OF THE INVENTION

1. Field of the Invention

The present invention relates to a reusable filter unit which can be used, for example, with internal combustion engines, such as diesel or gasoline powered engines, and which provides both a filtering and an additive function. The filter can be used for a variety of fluid media, although the preferred embodiment describes a filter intended for water filtering purposes, used in the engine's cooling system.

2. Background Information

Filters for internal combustion engines having both filtering and additive functions are known in the art. Such filters have a filtering part which might include a paper filter media, and an additive part which would conventionally contain additives which can be used to treat the filtered fluid, such as anti-corrosion or anti-pitting additives.

These prior art dual function filters, however, suffer from a number of drawbacks. They are of a relatively complex construction, consisting of numerous parts, which render them difficult and expensive to manufacture. Also, these dual function filters are not reusable. When the filtering media within the filter become polluted with removed impurities, and/or when the chemical additive is exhausted, the filter must be discarded, or essentially reconstructed. Further, because of the complexity of the prior art units, they must be made largely of metal in order to withstand the constructional forces.

It is an object of this invention to provide a filter for fluids which alleviates the disadvantages of the prior art devices.

Specifically, it is an object of this invention to provide a filter which provides both a filtering and an additive function and which can be reused in that the filtering media and the additive can be replaced easily and conveniently without disassembling or reconstructing the device.

Further, it is an object of this invention to provide a filter which is relatively simple and inexpensive to construct and which is particularly adapted to be constructed of plastic components.

SUMMARY OF THE INVENTION

The above objects are achieved by a reusable fluid filter removably installed on a base and having a filtering part and an additive part. The filtering part has an inlet aperture for receiving fluid from the base and an outlet for returning of fluid to the base after the fluid has passed through the filtering part and the additive part. A filtering media is retained in the filter part and is removable and replaceable via the inlet aperture. The filter part has an aperture for allowing filtered fluid to pass to the additive part, the filtered fluid aperture being exposed upon removal of the filtering media to permit replenishment of additive in the additive part.

IN THE DRAWINGS

DETAILED DESCRIPTION OF DRAWINGS

Figure 1:
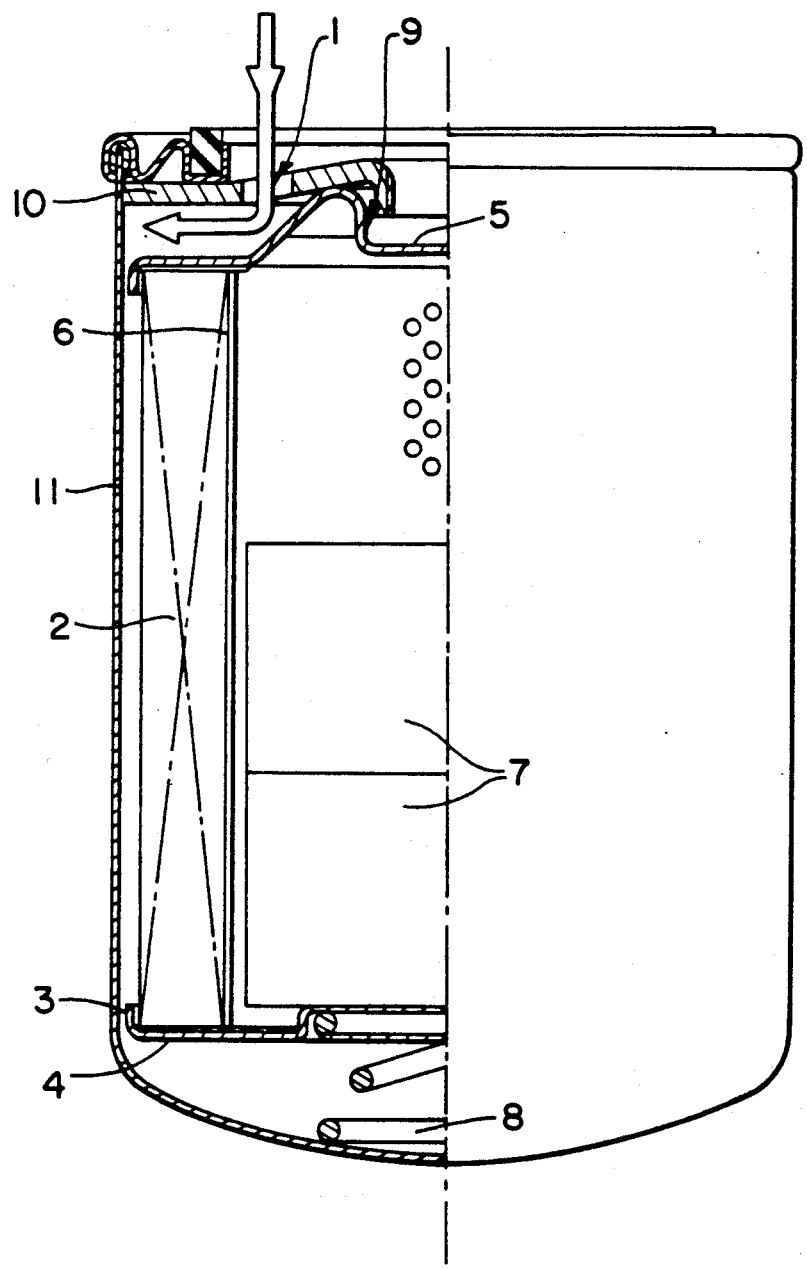
FIG. 1 shows a prior art dual function filter unit.

FIG. 1 shows a typical prior art filter which includes both a filtering part and an additive part. Such a filter may be used in, for example, the cooling system of a diesel engine for coolant filtering.

The filter would be connected to the engine with the upper portion, as seen in FIG. 1, of the filter being mounted on a suitable receiving means located on the engine. The medium to be filtered, in this example, a coolant mixture of water and antifreeze, would leave the cooling system of the engine and enter the open upper portion of the filter as shown by the arrow in FIG. 1. The coolant would then pass through opening 1 and enter the body of the filter where it would encounter filtering media 2. Filtering media 2 consists, conventionally, of a cylinder of treated paper, which typically would be heated, or cured, prior to use. Filtering media 2 is attached to a lower end plate 3, which is made of metal. Filtering media 2 is held in place on the lower end of plate 3 by means of adhesive material 4. Upper metal plate 5 is affixed to the upper end of filtering media 2, this also being held in place by adhesive material.

In operation, coolant would pass inward through the filtering media 2 towards the center of the filter. The inner wall of filtering media 2 rests against a perforated center tube 6 which includes a plurality of holes which allows the water to enter into the center, or additive, portion of the filter. In the additive portion of the filter there is located an additive product 7 which could be solid, granular, or paste. The water would pass through the additive product and will carry with it a certain amount of this additive, which will then be distributed throughout the cooling system.

The additive 7, commonly called "dry chemical additive" or DCA, available from Fleetguard, Inc., Building 100, Suite 500, BNA Corporate Center, Nashville, Tenn. 37217, can be used for a variety of purposes, such as preventing corrosion or pitting in the cooling system.

At the bottom of FIG. 1 is seen spring 8 which acts upon the lower end plate 3 to force the entire central portion of the filter in an upward direction so that the ridge 9 in the upper metal plate 5 will press against the metal nut plate 10. This closure prevents the entering coolant from passing directly to the exit of the filter without passing through the filtering and additive portions. The entire filtering unit is contained within a pressed metal shell 11.

There are a number of disadvantages with the above described prior art structure. The device is relatively heavy as it must be made of metal for strength and is complex to construct. Further, the device is a "throw away" structure, that is, it is constructed with the filter and additive permanently in place, and when these elements are exhausted, the filter is not reusable, but rather must be discarded and replaced by a new filter having new filtering media 2 and new additive 7.

The filter according to the present invention is seen in FIGS. 2 through 7.

The filtering part of the filter unit is the top portion as seen at 30 in FIG. 2, and the additive part is seen below at 29. The flow of fluid through the filter is indicated by the arrow in FIGS. 2 and 3.

Figure 2:
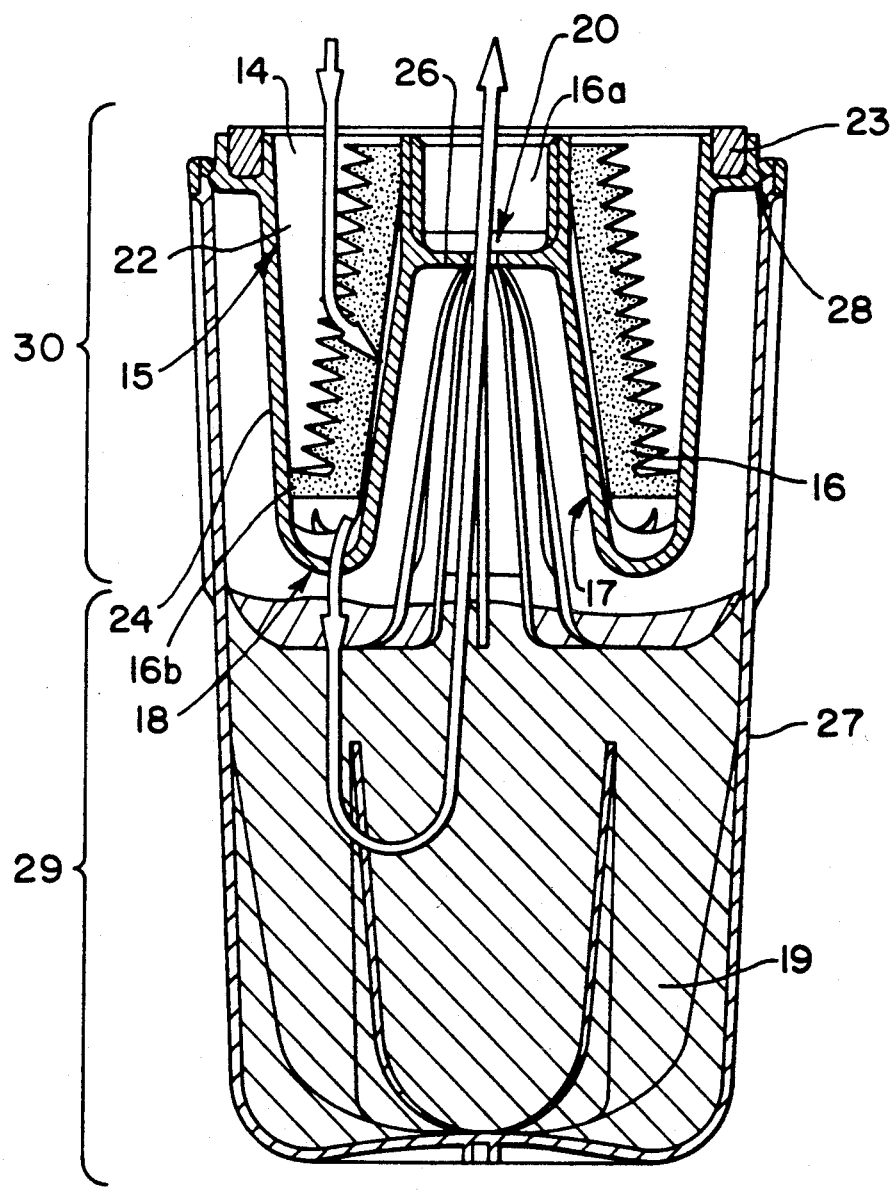
FIG. 2 is a sectional side view of the filter according to the invention.
Figure 3:
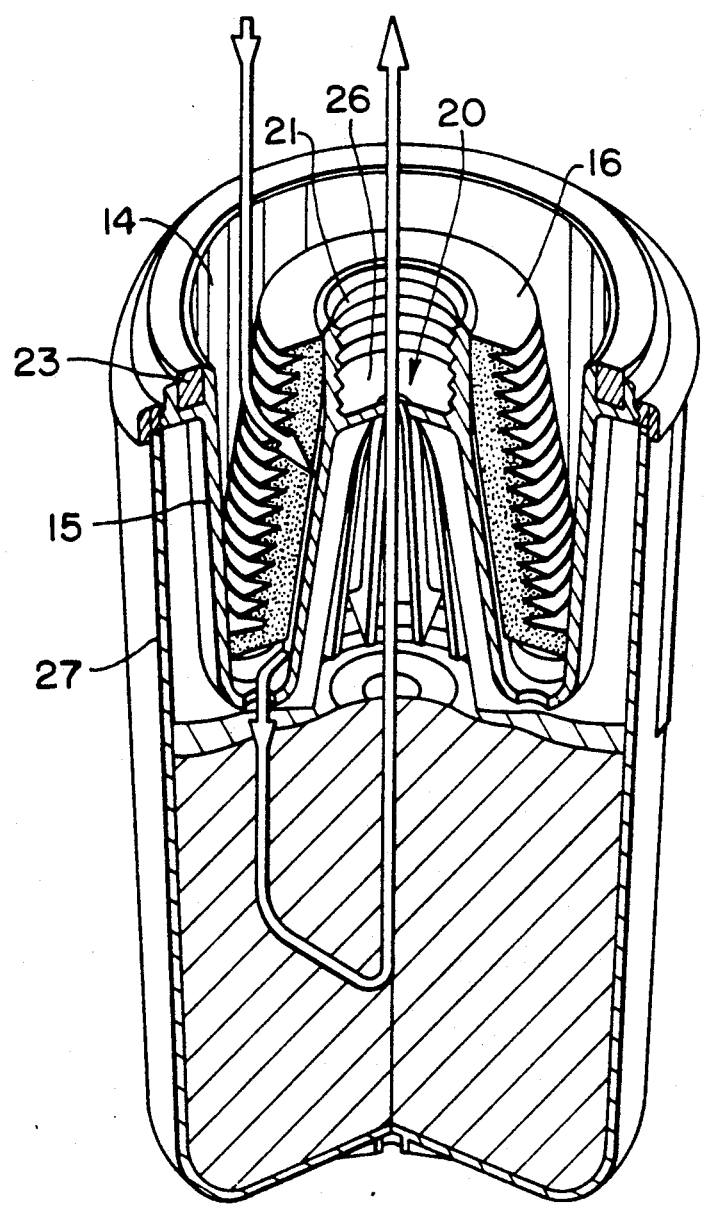
FIG. 3 is a sectional perspective view of the filter according to the invention.

As seen in FIGS. 2 and 3, the fluid enters the filter through fluid input aperture 14 and passes into a toroidal shaped plastic element 15 which constitutes a means for retaining the filter media, where it encounters filtering media 16. The filter media retainer means 15 includes a toroidal shaped cavity 22, open at the upper surface, with its cylindrical inner walls 17 being connected by a central connecting element 26 which is molded integrally as a part of the retaining means 15.

The filtering media 16 is in the form of a cone open at both ends, and having an outer surface which contains a plurality of protrusions as is seen in FIG. 2. Filtering media 16 is preferably a solid element made of agglomerated fiber, normally, an acrylic fiber which is held together by any suitable resin.

The filtering media 16 fits into retaining means 15 between outer chamber wall 24 and inner chamber wall 17. Filtering media has an inner diameter 16a that seals against the top portion of the retaining means inner wall 17 and an outer diameter 16b that seals against the outer chamber wall 24. In one form the seals may be achieved by dimensioning the parts to achieve a slight interference fit. However, there are other means for sealing which may also be employed.

In operation, the coolant passes inward through filtering media 16 and flows between the inner wall of filtering media 16, and retaining means inner wall 17 in a downwardly direction. The now filtered coolant passes below the filtering media into the lower part of the retaining means.

The filtered coolant then passes through additive aperture 18 and enters the lower, or additive, part 29 of the filter. The additive part 29 of the filter contains an additive product 19. This additive product is typically in a paste, granule, or liquid form. The additive, as discussed above, is used to treat the coolant with, for example, anti-corrosion or anti-pitting chemicals.

The coolant passes through the additive and reverses direction as seen in FIGS. 2 and 3 and passes upward through output aperture 20 and reenters the engine coolant system. The output aperture 20 is located in central connecting element 26 which connects the inner walls 17 of the retaining means 15.

Outer shell 27 is preferably a single piece plastic unit. Outer shell 27 is permanently connected to retaining means 15 at joint 28 by, for example, fusion welding. The retaining means 15, like the shell, is also preferably a single piece plastic unit and thus, the filter can consist of only two elements, permanently bonded.

As is best seen in FIG. 3, threads are provided in the inner central portion of the retaining means 15 at 21. These threads will be screwed upon a corresponding element on the engine in order to affix the filter unit to the engine.

There is also provided an annular gasket 23 which ensures fluid tightness at the outer periphery of the filter.

Figure 4:
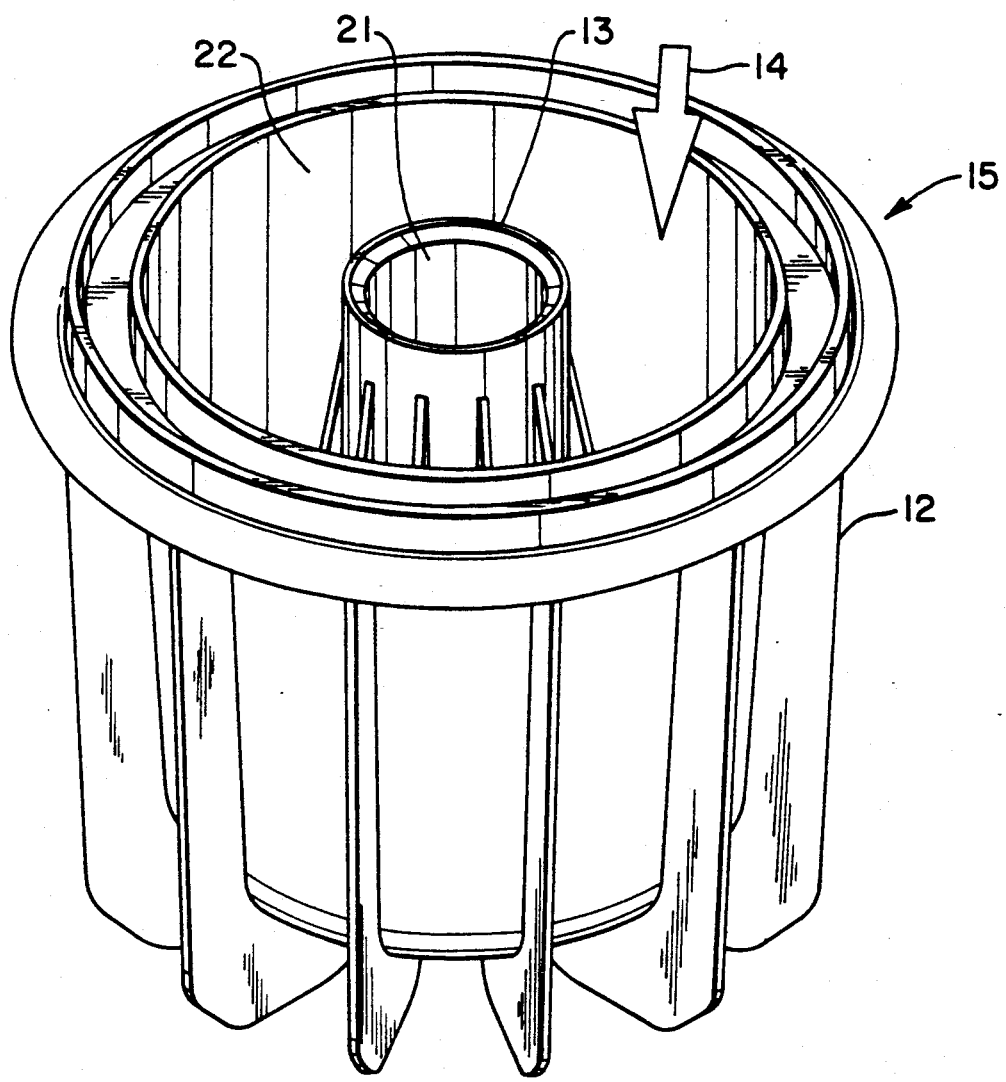
FIGS. 4 and 5 are perspective views of the filtering part of the filter according to the invention.
Figure 5:
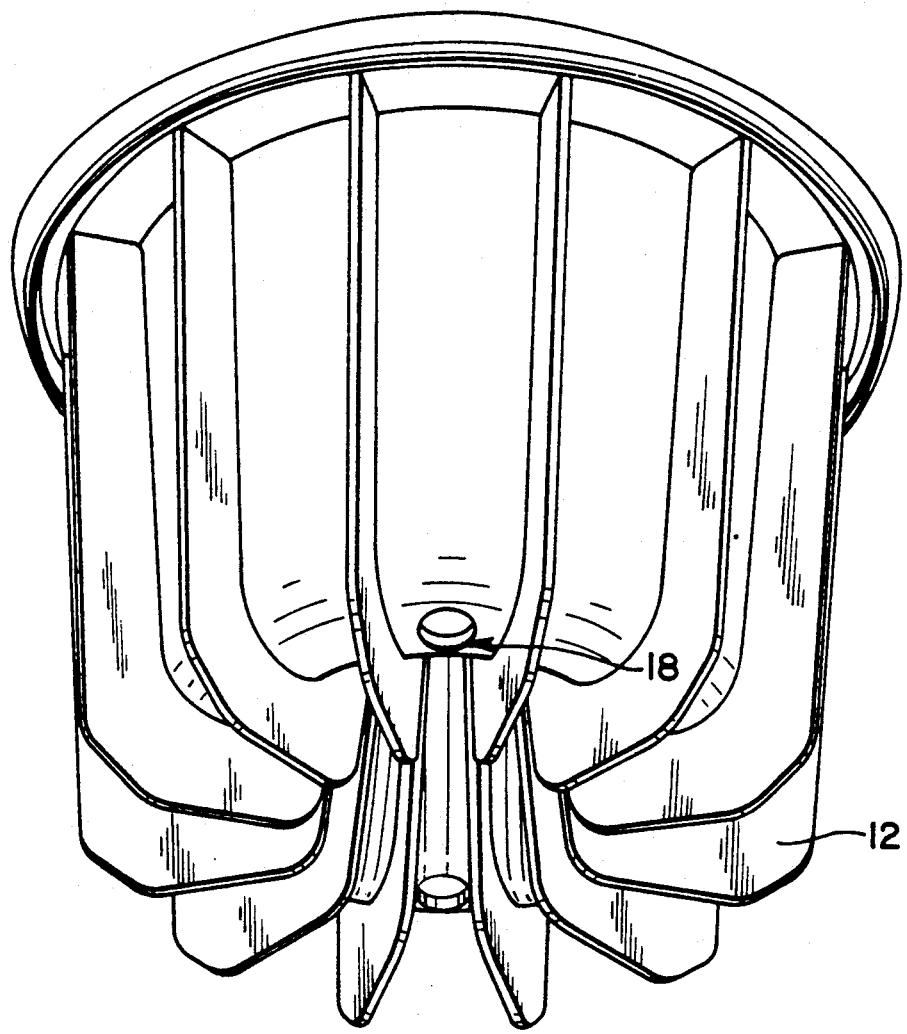
Figure 6:
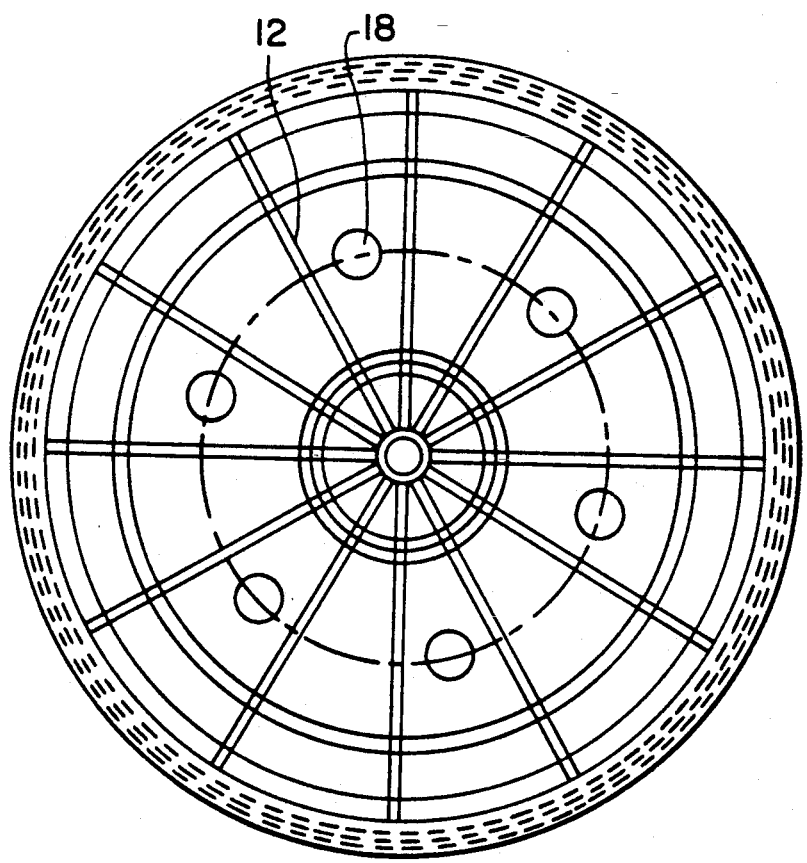
FIG. 6 is a bottom view of the filtering part.

FIGS. 4 and 5 are two perspective views of the retaining means 15.

FIG. 4 shows the fluid input aperture 14 into which the coolant from the cooling system would enter the retaining means. The filtering media 16 (not shown in FIG. 4) would fit into toroidal shaped cavity 22 slipping over the central post element 13. The upper portion of the output aperture through which coolant will re-enter the engine's cooling system is seen at 20. Plastic reinforcing ribs, which are preferably molded of one piece integral with with the retaining means 15 are seen at 12 and positioned in planes that fan out from the central longitudinal axis of retainer 15.

FIG. 5 shows another perspective view of the retaining means 15 depicting another view of the reinforcing elements 12. An additive aperture is seen at 18; preferably, there would be a plurality of additive apertures, for example, one between each of the reinforcing ribs 12.

Figure 7:
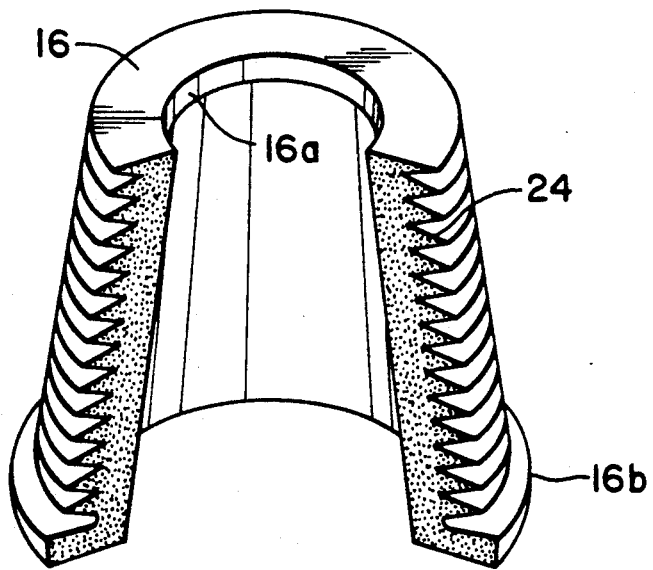
FIG. 7 is a sectional perspective view of the filtering media which is used in the filter according to the invention.

FIG. 7 shows replaceable filtering media 16 removed from the filter. Filtering media 16 is a solid element having a sawtooth-like outer surface 24, which is provided so that the filtering media will have the maximum outer surface area. The filtering media is preferably made from agglomerated acrylic fibers held together by phenolic resin.

Preferably, the media has so-called "growing porosity" which means that the porosity is reduced from the outer surface of the filter towards the inner surface, this ensuring that the particles will be trapped in the depth of the media.

There are considerable advantages accruing to the above-described design. The unit is of a fixed construction in that the retaining means 15 is permanently welded to the outer shell 27, which makes the unit easy and inexpensive to manufacture. Despite this fixed construction, the filter is entirely reusable. After the unit has been in operation for a period of time and the filter media is polluted, and/or the additive exhausted, these may be replaced without discarding the filter in its entirety or disassembling and rebuilding the filter. This is accomplished according to the invention as follows: the filter would be unscrewed from the engine via threads 21. With the filter removed from the engine, the solid filtering media 16, would be exposed as seen in FIG. 3. The operator would then simply lift out this solid filtering media 16 and discard it. Once the filter media 16 is removed, additive apertures 18 at the bottom of the retaining means 15 would be exposed. The operator can then add liquid, granular, or paste additive into retaining means 15 and this additive would flow through the additive apertures (18) into the additive part 29 of the filter. After the new additive has been added to the filter, the operator would then slip on another filtering media element 16 and the filter would then be in an entirely refreshed state.

There is thus provided a reusable filter which has both filtering and additive functions, wherein both the filtering media and the additive can be replaced without disassembling and reassembling the unit, and, further, having an extremely simple construction consisting, in essence, of two inexpensive single piece plastic elements, retaining means 15 and outer shell 27 which are permanently bonded to form a filter unit which, although reusable, need never be disassembled.

Having thus described the invention, what is claimed as novel and desired to be searched by Letters Patent in the United States is we claim:

1. A re-usable filter adapted to be removingly affixed to an engine, said filter comprising:
   a housing having an open end and a closed end;
   a filtering part disposed within said housing adjacent said open end, said filtering part including a disposable filtering media, an additive part disposed within said housing between the filtering part and said closed end, said additive part including a replaceable chemical additive, the filtering part being adapted to receive said filtering media and the additive part being adapted to receive said chemical additive;

the filtering part including a retaining means for retaining said filtering media, said retaining means being sealingly connected to the open end of said housing, said retaining means including means for defining a cavity facing exteriorly of said housing, the cavity of said retaining means defining an input aperture abuttable against the engine for receiving fluid to be filtered from the engine, said retaining means including means for defining an output aperture also connectable to the engine, said filter media being sealingly disposed in said cavity to form an inlet side facing said input aperture and an outlet side;

said filtering media being removable and replaceable via said input aperture when the filter is removed from the engine;

said filter media retaining means including an additive aperture means disposed on said outlet side of the cavity for establishing a flow connection between said additive part and said filtering part, wherein said additive aperture means is accessible via said input aperture to facilitate replacement of said chemical additive when the filter is removed from the engine and the filtering media has been removed from the retaining means.

2. A filter according to claim 1 wherein the filtering media retaining means comprises a toroidal shaped shell forming said cavity with the input aperture being located at one end thereof and the additive aperture means being located at the opposite end of said toroidal shell, the filtering media fitting into said cavity between the input aperture and additive aperture.

3. A filter according to claim 2 wherein the filtering media comprises agglomerated fibers with resin and constitutes a single replaceable element.

4. A filter according to claim 2 wherein the filtering media retaining means comprises an annular radially outer wall and an annular radially inner wall located on either side of said additive aperture means and forming therebetween said input aperture and including a central connecting element for connecting the annular radially inner walls of the filtering media retaining means to said engine.

5. A filter according to claim 4 wherein the said output aperture is located in the said central connecting element of the filtering media retaining means.

6. A filter according to claim 1 wherein said housing is comprised of outer shell and wherein the filtering media retaining means is permanently bound to the shell at the circumference of the shell.

7. A filter according to claim 6 wherein the outer shell and the filtering media retaining means each comprise a one piece plastic element and is permanently bound together by fusion welding.

8. A filter according to claim 1 wherein the filtering media retaining means is shaped generally as a toroid having an open end forming said input aperture, the open end of said torroid being removeably affixed to the engine for receiving unfiltered fluid input and the surface opposite said open end containing the additive aperture means and wherein the said filtering media and the said additive are respectively replaceable without disassembling the filter unit through the said open end and additive aperature means when the filter is removed from the engine.

* * * * *